United States Patent [19]

Aoki et al.

[11] Patent Number: 4,798,767
[45] Date of Patent: Jan. 17, 1989

[54] OPTICAL INFORMATION RECORD MEDIUM

[75] Inventors: Tokuei Aoki; Junichiro Kudo; Katsumi Kohno, all of Miyagi, Japan

[73] Assignee: Sony Corporation, Tokyo, Japan

[21] Appl. No.: 107,342

[22] Filed: Oct. 13, 1987

[30] Foreign Application Priority Data

Oct. 14, 1987 [JP] Japan ................... 62-242136

[51] Int. Cl.⁴ ............... B32B 27/36; C08G 63/62
[52] U.S. Cl. .................. 428/412; 428/332; 428/216; 428/693; 428/900; 428/463; 427/322; 427/444; 523/205; 523/332; 264/176.1
[58] Field of Search ......... 428/412, 332; 427/322, 427/444; 523/205

[56] References Cited

U.S. PATENT DOCUMENTS 3,971,872  7/1976  Leboeuf ................. 427/322
4,680,374  7/1987  Hasuo et al. ............ 428/412

OTHER PUBLICATIONS

AB, 86-066530/10, Mitsubishi Chem, 1/1986, J61019630-A.

Primary Examiner—P. C. Ives
Attorney, Agent, or Firm—Hill, Van Santen, Steadman & Simpson

[57] ABSTRACT

An optical information record medium is disclosed in which an optical information record layer is formed on a substrate made of a polycarbonate resin. The polycarbonate resin is purified to remove the residual chlorine in the resin enough to form the substrate containing no more than 1.0 ppm of chlorine ion. By reducing the residual chlorine ion in the polycarbonate substrate, anticorrosion characteristics of the optical information record medium are greatly improved.

3 Claims, 1 Drawing Sheet

OPTICAL INFORMATION RECORD MEDIUM

BACKGROUND OF THE INVENTION

The present invention relates to an optical information record medium and improvement of corrosion resistance of a recording layer formed on a substrate made of polycarbonate resin.

The optical record system has such characteristics or advantages as handiness that enables non-contact recording/reproduction, high durability in dirt or scratches, and a storage capacity several tens or hundred times larger than a conventional magnetic record system utilizing electromagnetic induction, for example, that it is not only utilized as a so-called compact disk or a laser disk wherein audio signals or video signals are digitally recorded, but also is anticipated to be used in filing code information or image information with great storage capacity.

Among the optical information record media, there is a wide variety of write once type optical disks, or magneto optical disks, other than the aforementioned compact disks that are only for reproduction, but each of them consists of an information record layer formed on a transparent substrate made of a polycarbonate resin.

A polycarbonate resin is a suitable material for a substrate of the optical information record medium since it has such features as: having thermal resistance at the time of melt molding and can be molded with ease; being not transformed or changed in quality after disk molding; and having supreme mechanical characteristics.

On the other hand, as for a record material of the information record layer, metallic record materials such as rare earth elements-transition metal amorphous alloy membranes used in an magneto optical disk have been exploited. For example, materials such as TbFeCo, TbFe, GdFe have been reported to be desirable in sensitivity or reading capability, etc.

In order to utilize an optical information record medium having an information record layer made of aforementioned metallic record material, there is a as to how to improve its corrosion resistance.

In fact, when an optical information record medium such as a compact disk or an magneto-optical disk having a substrate made of a polycarbonate resin form is stored under high temperature and high humidity, a corrosion originates in a record film or a reflection film. An inferior reproduction is caused due to the corrosion, so it is a serious problem for an optical information record medium that affects its reliability.

OBJECT OF THE INVENTION

In view of the foregoing, it is an object of the present invention to provide an optical information record medium having a substrate made of a polycarbonate resin form that can restrain the generation of corrosion.

It is a further object to provide an optical information record medium that produces few inferior reproductions but has high reliability.

DESCRIPTION OF THE PREFERRED EMBODIMENTS

Figure 1:
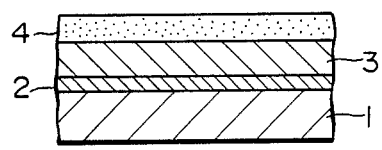
FIG. 1 is a fragmentary sectional view of the essential structure of an embodiment of an magneto optical disk.
Figure 3:
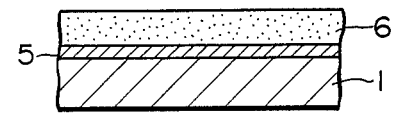
FIG. 3 is a fragmentary sectional view showing the essential structure of a compact disk.

Studying carefully in order to clarify the mechanism of the generation of corrosion in an optical information record medium utilizing a polycarbonate resin as a substrate material for a long time, the inventors of the present invention have found that the residual chlorine in the substrate considerably affects the mechanism.

The present invention of an optical information record medium having an information record layer wherefrom signals are optically read on a substrate made of a polycarbonate resin was accomplished based on the aforementioned study, and is characterized in that said substrate contains a residual chlorine ion of no more than 1.0 ppm.

In the optical information record medium of the present invention, the polycarbonate resins used as the substrate material is produced by the phosgene process, by which a dihydric phenolic compound (for example, bisphenol A) is made to react on a phosgene in the presence of an acid binder (such as an alkali like sodium hydroxide) and a solvent (such as methylene chloride). Specifically, the polycarbonate resins thus obtained are a branched polycarbonate resin using multifunctional organic compounds with more than three functionalities having a phenol hydroxyl group as a branching agent, a terminal long-chain alkyl polycarbonate resin using one-functional organic compound such as a long-chain alkyl acid chloride or a long-chain alkyl ester permutation phenol as a terminator, a terminal long-chain alkyl branch polycarbonate resin using both of the aforementioned branching agents and terminator.

These polycarbonate resins are usually molded into substrates through such processes of being thrown into an injection molding machine n the form of pellets, fluidized by a heater, and being injected into a metallic mold. Yet in this invention, the residual chlorine ion contained in the substrate at the state of a form obtained by said injection molding is adjusted to be no more than 1.0 ppm. According to an experiment by the present inventors the error rate was observed to increase in case the residual chlorine ion exceeds the level of 1.0 ppm.

In order to lower the residual chlorine, the polycarbonate resins produced by the phosgene process should be adequately refined. In this connection, for example, executing a washing process by purified water repeatedly for completely removing the electrolyte materials like salts, alkalis or other impurities from the polymer solution formed by the phosgene process, etc., or expelling methylene chloride as a solvent thoroughly from the polycarbonate resin are useful measures to lower the chlorine contained in the polycarbonate resins, thus it results in the reduction of the residual chlorine at the time of forming a substrate.

Generally, there remains a considerable quantity of chlorines in the polycarbonate resins on the market, and at the time of their being formed into the substrates, the residual chlorine ion reaches such a high level of 1.3–1.6 ppm.

The residual chlorine ion originates in an electrolyte (such as sodium chloride) remaining in a polycarbonate resin polymer, etc., from using methylene chloride as a solvent, or chlorine which is combined with an end of a polymer, and has remarkably harmful influence on the anticorrosion properties of an optical information record medium.

Though one may think that washing a substrate might be a help for restraining the influence of the residual chlorine, it is only a temporary measure and cannot lead to the fundamental solution of the problem. Also, it is considered to provide a protective coat. Yet, even a tiny crack causes a corrosion, so this measure cannot solve the problem fundamentally, either.

Hence in the present invention, the refinig process of the polycarbonate resin was reviewed, and it, was realized that the restraint of generation of corrosion in an information record layer of an optical information record medium by removing thoroughly the chlorine sources contained in a polycarbonate resin used as a substrate material, and by retaining the residual chlorine ion in the substrate to be no more than 1.0 ppm would alleviate the problem.

The invention will now be further described according to the results of the practical experiments.

First, the polycarbonate resin pellets that have respectively different degrees of chlorine removing processes were prepared, and were thrown into an injection molding machine for executing an injection molding at the neater temperature of 320°–360° C., and metallic mold temperature of 80°–115° C. to form a disk-type substrate that is 1.2 mm in thickness. Thus obtained substrates are called substrate A to D, respectively.

Secondly, the residual chlorine remaining in these substrates A to D was measured by chlorine ion. In this case, the process of the potentiometric titration at constant current was employed for the measurement.

Specifically, we cut a 5 g—sample from the respective substrates, precisely weighed disolved them into 150 ml methylene chloride, and added an acetone thereon. Immediately after this process, the chloride density was measured by the potentiometric titration using an automatic titrator with a 0.005 M silver nitrate-/acetone solution. For reference, the automatic titrator used was a COMTITE7 model of Hiranuma Reporting Titrator.

As a result, the residual chlorine of the substrate A was 0.9 ppm, that of the substrate B was 1.2 ppm, that of the substrate C was 1.3 ppm, and that of the substrate D was 1.9 ppm.

As a next step, as shown in FIG. 1, a magneto-optical disk was produced wherein a $Si_3N_4$ film (2) having a film thickness of 500 Å, a TbFeCo film (3) having a film thickness of 800 Å (the TbFeCo film (3) serves as a recording layer), and an ultraviolet hardened resin layer (4) having a thickness of 5 m are in turn coated forming a layer on the respective substrates (1) (substrates A–D).

Figure 2:
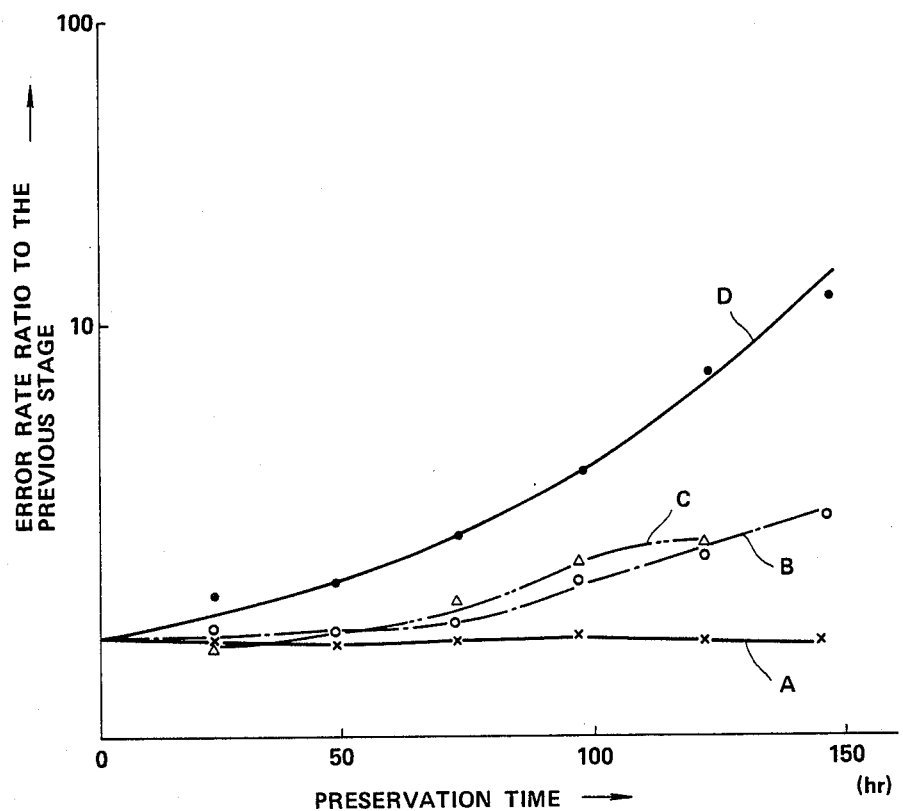
FIG. 2 illustrates the error rate changes as the time passes with the varying residual chlorine contained in the respective magneto optical disks.

Then, the error rate increase was evaluated in regard to the respective magneto-optical disks thus obtained. On evaluating, the respective magneto-optical disks were preserved under the condition of a temperature of 90° C., the relative humidity of 85%, and the error rate increase by the time lapse was given in a ratio to the value in the initial stage, the results of which are shown in FIG. 2. In the figure, a curve A indicates the magneto-optical disk using the substrate A, a curve B does the magneto-optical disk using the substrate B, a curve C does the magneto-optical disk using the substrate C, and a curve D does the magneto-optical disk using the substrate D, respectively.

With reference to FIG. 2, in the substrate (1) wherein the residual chlorine is no more than 1.0 ppm (the magneto-optical disk using the substrate A), the error rate hardly increases, presenting a favorable anticorrosion property. On the contrary, when the residual chlorine exceeds the level of 1.0 ppm, the error rate due to the generation of corrosion increases. It was confirmed that the more the residual chlorine increases, the more notable this tendency becomes.

Furthermore, we produced a compact disk using a substrate with a low residual chlorine (substrate A), whereon a record layer (5) made of an Al film having a thickness of 1500 Å and an ultraviolet hardened resin layer (6) having a thickness of 10 μm are. coated in turn. The compact disk thus obtained was observed to generate no corrosion and have favorable preservation characteristics.

As mentioned above, the present invention was described with practical results of the experiments. It is to be understood that this invention may be applied not only to the aforementioned magneto-optical disks or compact disks but to various kinds of optical information record mediums such as write once type optical disks. Also, the structures of the media described herein are illustrative and not restrictive.

From the foregoing it is seen that in the present invention of an optical information record medium, when the residual chlorine ion remaining in the polycarbonate resin substrate is adjusted to be no more than 1.0 ppm, the generating of corrosion in the information record layer can be remarkably restrained, thus an optical information record medium that produces few inferior reproductions but is superior in long-term reliability can be provided.

We claim as our invention:

1. An optical information record medium having an optical information recording layer wherefrom signals are optically read on a substrate made of a polycarbonate resin, wherein the quantity of a residual chlorine ion contained in said substrate is adjusted to be no more than 1.0 ppm.

2. An optical information record medium according to claim 1, wherein said substrate is molded by using a polycarbonate resin.

3. An optical information record medium according to claim 2, said polycarbonate resin being refined by washing in purified water to remove residual chlorine enough to form a substrate containing no more than 1.0 ppm of chlorine ion.

* * * * *